(12) United States Patent
Watanabe et al.

(10) Patent No.: US 6,794,029 B2
(45) Date of Patent: Sep. 21, 2004

(54) LAYERED FILM AND PACKAGING PRODUCT THEREOF

(75) Inventors: Kazuyuki Watanabe, Oita (JP); Takao Nasu, Oita (JP)

(73) Assignee: Showa Denko Plastic Products Co., Ltd., Tokyo (JP)

(*) Notice: Subject to any disclaimer, the term of this patent is extended or adjusted under 35 U.S.C. 154(b) by 0 days.

(21) Appl. No.: 10/332,711

(22) PCT Filed: Jul. 18, 2001

(86) PCT No.: PCT/JP01/06244

§ 371 (c)(1),
(2), (4) Date: Jan. 13, 2003

(87) PCT Pub. No.: WO02/06048

PCT Pub. Date: Jan. 24, 2002

(65) Prior Publication Data

US 2003/0143416 A1 Jul. 31, 2003

Related U.S. Application Data

(60) Provisional application No. 60/249,291, filed on Nov. 17, 2000.

(30) Foreign Application Priority Data

Jul. 18, 2000 (JP) .................................... 2000-217338
Jun. 21, 2001 (JP) .................................... 2001-188658

(51) Int. Cl.$^7$ .......................... B32B 27/08; B32B 27/32
(52) U.S. Cl. ..................... 428/336; 428/213; 428/215; 428/516
(58) Field of Search ............................. 428/213, 215, 428/336, 516

(56) References Cited

U.S. PATENT DOCUMENTS

| 5,302,442 A | * | 4/1994 | O'Brien et al. ............. 428/213 |
| 5,314,749 A | | 5/1994 | Shah |
| 5,786,050 A | | 7/1998 | Otsuka et al. |

FOREIGN PATENT DOCUMENTS

| EP | 0178061 | 4/1986 |
| JP | 39-22351 B | 10/1963 |
| JP | 57-28777 A | 2/1982 |
| JP | 58-1672 A | 1/1983 |
| JP | 61-37647 U B | 10/1986 |
| JP | 63-179741 A | 7/1988 |
| JP | 10-24517 | 1/1998 |
| JP | 2000-128229 | 5/2000 |
| JP | 2000-168003 | 6/2000 |
| WO | WO 93 17863 | 9/1993 |

OTHER PUBLICATIONS

I.D. Rubin, Poly (I–Butene)—its preparation and properties, Gordon and Breach Science Publishers, Inc., New York (1968), pp. 87–98 (Chapter 7) and pages 99–113 (Chapter 8).

D.G. Natta et al., J. Polymer Sci., vol. 24, pp. 119–122 (1957).

Saishin Laminte KaKo Binran (Newest Lamination Processing Handbook), pp. 861–866 (1989), published by Kako Gijutsu Kenkyu Kai.

I.D. Rubin, Poly (1–Butene)—its preparation and properties, Gordon and Breach Science Publishers, Inc., New York (1968)—front page, table of contents, and preface.

* cited by examiner

*Primary Examiner*—D. S. Nakarani
(74) *Attorney, Agent, or Firm*—Sughrue Mion, PLLC

(57) ABSTRACT

The object of the present invention is to provide a layered film which exhibits, when used as a sealant film, excellent openability, good clouding property, high water vapor barrier property and superior seal strength stability and which is suitable as a medical packaging material, and to provide a packaging product thereof. The layered film comprises at least two layers of a resin composition layer [layer (A)] comprising (a) from 60 to 90% by mass of linear low-density polyethylene produced using a single site catalyst and (b) from 40 to 10% by mass of a polybutene-1, and a high-density polyethylene layer [layer (B)] comprising (c) a high-density polyethylene having a density of 0.950 to 0.970 (g/cm$^3$). The packaging product has the layer (A) of the layered film as a sealant layer.

11 Claims, No Drawings

LAYERED FILM AND PACKAGING PRODUCT THEREOF

CROSS-REFERENCE TO RELATED APPLICATIONS

This application claims the benefit pursuant to 35 U.S.C. §119(e)(1) of U.S. Provisional Application, No. 60/249,291 filed Nov. 17, 2000.

TECHNICAL FIELD

The present invention relates to a layered film which exhibits, when used as a sealant film, excellent openability, good clouding property (the "clouding" as used herein means the "whitening"), high water vapor barrier property and superior seal strength stability and which is suitable as a medical packaging material, and also relates to a packaging product thereof.

In particular, the layered film of the present invention is suitable as a sealant film for a packaging product which is produced through knurl-sealing, such as a packaging product for a blood sugar measuring electrode.

This application is based on Japanese Patent Application No. 2000-217338, Japanese Patent Application No. 2001-188658 and U.S. Provisional Patent Application No. 60/249,291, the contents of which are incorporated herein by reference.

BACKGROUND ART

Heretofore, polyolefin film is used as various food or medical packaging materials by making use of its characteristic features such as inexpensivenss, resistance against heat or chemicals and easy heat sealability.

In the food packaging material, an aluminum foil, a saponified product of ethylene-vinyl acetate copolymer resin and vinylidene chloride resin are used as a gas barrier layer, the gas barrier layer is combined with a polyamide resin layer, a polyester resin layer and the like, and a polyolefin-base resin such as polypropylene or polyethylene is used as a heat seal layer. Also in the medical packaging material, a polyolefin-base resin is used as a heat seal layer.

With respect to the easily openable sealant film, a method of using a resin composition obtained by mixing polypropylene and polyethylene for the sealant layer, and a method of using a resin obtained by graft-polymerizing styrene to a polyolefin-base resin are known.

In the sealant film for a packaging product which is produced through knurl-sealing, such as a packaging product for a blood sugar measuring electrode, a resin composition obtained by mixing a linear low-density polyethylene with a low melting point polypropylene has been heretofore used for the sealant layer and thereon, a homopolypropylene as a substrate layer is stacked.

The sealant film is characterized in that when the packaging product is opened, the heat sealed portion is clouded ("the heat sealed portion is clouded" as used herein means that the heat sealed portion is whitened) and therefore, it can be confirmed that the packaging product was infallibly heat-sealed.

However, the sealant film has a problem in that since the heat seal strength is as high as 1,200 g/15 mm-width or more, opening is difficult; since the latitude of the heat seal temperature is narrow, the knurl-sealing machine fails in controlling the temperature; or when the heat seal pressure fluctuates, homopolypropylenes are heat-sealed with each other and opening cannot be attained.

Examples of the easily openable sealant film include a packaging product having a heat sealable resin layer which comprises a resin composition layer having a thickness of 5 to 25 μm and containing a crystalline polypropylene-base resin having a melt index of 2 to 100 (g/10 min) and a polyethylene having a melt index of 2 to 50 (g/10 min) in a weight ratio of 50:50 to 95:5 (see, JP-A-58-1672 (the term "JP-A" as used herein means an "unexamined published Japanese patent application")), an easily openable drop lid comprising three layers of an uppermost layer formed of a heat-resistant resin layer, an intermediate layer formed of a polypropylene and a cohesive failure sealant layer provided under the intermediate layer and formed of a polypropylene-polyethylene blend polymer (see, JP-U-B-61-37647 (the term "JP-U-B" as used herein means an "examined Japanese utility model publication")), a container comprising a film layer formed of a blend material of a base resin comprising a crystalline polypropylene or a crystalline propylene-ethylene copolymer with from 8 to 30 wt % of an ethylene-vinyl acetate copolymer having a vinyl acetate content of 8 to 5 wt %, where the heat seal strength after the thermal sterilization is 100 to 1,700 g/cm (see, JP-A-57-28777), and a composite film comprising a propylene-base resin layer and a resin composition layer containing a propylene-ethylene random copolymer and/or a propylene-ethylene-butene-1 ternary copolymer, and a high-pressure polyethylene and/or a linear low-density polyethylene (see, JP-A-63-179741).

These sealant films have a problem in that the low-temperature heat sealability is inferior, the opening strength is too strong or the heat seal portion shows poor clouding or is not clouded at all at the time of opening.

Examples of the case using a combination of a polyethylene and a polybutene-1 as in the present invention include a method of blending a polyethylene and a polybutene-1 for preventing distortion and cracking of a polyethylene-made bottle, pipe, electric wire coating or the like due to contact with a viscous liquid (see, JP-B-39-22351 (the term "JP-B" as used herein means as an "examined Japanese patent publication")). However, this publication neither discloses nor suggests the object of the present invention or the method for solving the problems described in the present invention.

The object of the present invention is to provide a layered film which exhibits excellent openability, good clouding property, high water vapor barrier property and superior seal strength stability as compared with conventional films, and which is suitable as a food or medical packaging material fitted to knurl-sealing, and a packaging product using said layered film.

DISCLOSURE OF INVENTION

As a result of extensive investigations, the present inventors have found that the above-described object can be attained by stacking a specific resin composition layer and a high-density polyethylene layer. The present invention has been accomplished based on this finding.

More specifically, the layered film of the present invention comprises at least two layers of a resin composition layer [layer (A)] comprising (a) from 60 to 90% by weight of a linear low-density polyethylene produced using a single site catalyst and (b) from 40 to 10% by weight of a polybutene-1, and a high-density polyethylene layer [layer (B)] comprising (c) a high-density polyethylene having a density of 0.950 to 0.970 (g/cm$^3$).

The linear low-density polyethylene of the layer (A) has a density of 0.890 to 0.935 (g/cm$^3$) and a melt flow rate of 2 to 20 (g/10 min).

The high-density polyethylene (c) of the layer (B) has a melt flow rate of 1 to 15 (g/10 min).

The layered film is produced by forming a film at an extrusion temperature of 160 to 250° C. and cooling the film at a cooling temperature of 40 to 80° C.

The packaging product of the present invention comprises sealant layers, wherein one sealant layer is a layer (A) of a layered film comprising at least two layers of a resin composition layer [layer (A)] comprising (a) from 60 to 90% by weight of a linear low-density polyethylene produced using a single site catalyst and (b) from 40 to 10% by weight of a polybutene-1, and a high-density polyethylene layer [layer (B)] comprising (c) a high-density polyethylene having a density of 0.950 to 0.970 (g/cm$^3$).

In the packaging product of the present invention, one sealant layer is the layer (A) of said layered film comprising at least two layers of the layer (A) and the layer (B) and another sealant layer is a linear low-density polyethylene layer [layer (C)] comprising (d) a linear low-density polyethylene, which is produced using a single site catalyst, having a density of 0.890 to 0.925 (g/cm$^3$) and a melt flow rate of 2 to 10 (g/10 min).

In the packaging product of the present invention, one sealant layer is the layer (A) of said layered film comprising at least two layers of the layer (A) and the layer (B), and another sealant layer is a layer (C) of a layered film comprising at least two layers of a linear low-density polyethylene layer [layer (C)] comprising (d) a linear low-density polyethylene, which is produced using a single site catalyst, having a density of 0.890 to 0.925 (g/cm$^3$) and a melt flow rate of 2 to 10 (g/10 min), and a high-density polyethylene layer [layer (D)] comprising (e) a high-density polyethylene having a density of 0.950 to 0.970 (g/cm$^3$).

In the packaging product of the present invention, the layer (A) has a thickness of 3 to 15 μm.

In the packaging product of the present invention, the layered film comprising at least two layers of the layer (A) and the layer (B) is produced by forming a film at an extrusion temperature of 160 to 250° C. and cooling the film at a cooling temperature of 40 to 80° C.

The layered film of the present invention comprises at least two layers of a linear low-density polyethylene layer [layer (C)] comprising (d) a linear low-density polyethylene, which is produced using a single site catalyst, having a density of 0.890 to 0.925 (g/cm$^3$) and a melt flow rate of 2 to 10 (g/10 min), and a high-density polyethylene layer [layer (D)] comprising (e) a high-density polyethylene having a density of 0.950 to 0.970 (g/cm$^3$).

The layered film of the present invention is produced by forming a film at an extrusion temperature of 160 to 250° C. and cooling the film at a cooling temperature of 40 to 80° C.

BEST MODE FOR CARRYING OUT THE INVENTION

The present invention is described in detail below.

In the present invention, out of the resin compositions constituting the layer (A), the linear low-density polyethylene (hereinafter referred to as "SLLD") produced using a single site catalyst as the component (a) is obtained using a metallocene-base polymerization catalyst having a plurality of ligands and includes a linear low-density polyethylene having excellent low-temperature heat sealability and high transparency.

The SLLD means a copolymer of an ethylene with at least one member selected from α-olefins having from 3 to 20 carbon atoms.

The α-olefin having from 3 to 20 carbon atoms is preferably an α-olefin having from 3 to 12 carbon atoms and specific examples thereof include propylene, 1-butene, 1-pentene, 4-methyl-1-pentene, 1-hexene, 1-octene, 1-decene and 1-dodecene. The content of the α-olefin having from 3 to 20 carbon atoms occupying in the copolymer is generally 30 mol % or less, preferably from 2 to 20 mol %.

The SLLD for use in the present invention preferably has a density (measured according to JIS K 7112 D Method) of 0.890 to 0.935 (g/cm$^3$), more preferably from 0.900 to 0.933 (g/cm$^3$), still more preferably from 0.910 to 0.931 (g/cm$^3$).

If the density is less than 0.890 (g/cm$^3$), the heat seal strength may be too strong, whereas if it exceeds 0.935 (g/cm$^3$), a feathering phenomenon is liable to occur.

The melt flow rate (hereinafter referred to as "MFR") is preferably from 2 to 20 (g/10 min), more preferably from 6 to 18 (g/10 min), and still more preferably from 7 to 17 (g/10 min).

If the MFR is less than 2 (g/10 min), the heat seal strength is too strong and the clouding property tends to be inferior. On the other hand, if the MFR exceeds 20 (g/10 min), the compatibility with polybutene is poor, a feathering phenomenon may be generated or the clouding property tends to be inferior. Moreover, the MFR is measured according to JIS K 7210 Test Condition 4 at a temperature of 190° C. under a load of 21.18 N.

The polybutene-1 (hereinafter referred to as a "PB") as the component (b) is obtained by the polymerization starting from a butene-1 monomer and is the same polyolefin as polyethylene and polypropylene. In general, the PB has a high molecular weight and a high isotacticity. For the polymerization, a polymerization method using a Ziegler-Natta catalyst and a butene-1 as a solvent, or a solution polymerization method using a hydrocarbon-base solvent such as hexane and heptane, is used.

The PB is known as a polymer having rubber elasticity because it has a second order transition point lower than that of polypropylene and therefore, the flexural modulus thereof at room temperature or a low temperature is higher than that of polypropylene (see, D. G. Natta et. al., *J. Polymer Sci.*, Vol. 25, p. 119 (1957)).

As compared with polyethylene or polypropylene, the PB is excellent in the mechanical properties such as tensile strength, impact strength and tear strength, and therefore, is used as a pipe starting material, a tube or a modifier.

In the field of film, the PB is used by blending it with another resin so as to impart low temperature heat sealability or easy peelability.

The properties and uses of the PB are described in detail, for example, in *Saishin Laminate Kako Binran* (*Newest Lamination Processing Handbook*), pp. 861–866 (1989), Kako Gijutsu Kenkyu Kai, and I. D. Rubin, *Poly(1-Butene)—its Preparation and Properties*, Gordon and Breach Science Publishers, Inc., New York (1968).

The PB for use in the present invention preferably has an MFR of 0.5 to 15 (g/10 min) according to ASTM D1238E, more preferably from 0.8 to 12 (g/10 min), and still more preferably from 1 to 10 (g/10 min). If the MFR is less than 0.5 (g/10 min), the seal strength may be too high, whereas if it exceeds 15 (g/10 mm), a feathering phenomenon may occur upon peeling the sealed portion or the clouding property may be inferior at the time of peeling.

The melting point of PB, measured by a method using a differential scanning calorimeter (DSC), is preferably 100 to 140° C. If the melting point is less than 100° C., a feathering phenomenon may occur in the portion where the sealed portion is peeled, or the clouding property is likely to be inferior at the time of peeling, whereas if it exceeds 140° C., the heat seal strength and the clouding property tend to be inferior.

The PB is available, for example, under the trade name of "BEAULON" from Shell Chemical and Mitsui Chemicals, and these PBs can be suitably used.

The blend ratio between the component (a) and the component (b) constituting the layer (A) is preferably such that the SLLD is from 60 to 90% by weight and the PB is from 40 to 10% by weight.

If the SLLD is less than 60% by weight, reduction may be caused in the water vapor barrier property, the seal strength and the clouding property, and also, a feathering phenomenon is disadvantageously liable to occur at the time of peeling.

On the other hand, if it exceeds 90% by weight, the clouding property deteriorates or at the heat sealing, sealing occurs in the periphery of the seal portion to impair the appearance of the packaging product or discourage the taking out of the contents.

The blend ratio is preferably such that the SLLD is from 65 to 85% by weight and the PB is from 35 to 15% by weight, more preferably the SLLD is from 67 to 82% by weight and the PB is from 32 to 18% by weight.

The high-density polyethylene (c) (hereinafter referred to as "HDPE") constituting the layer (B) preferably has a density of 0.950 to 0.970 (g/cm$^3$), more preferably from 0.952 to 0.965 (g/cm$^3$), and still more preferably from 0.953 to 0.962 (g/cm$^3$). If the density is less than 0.950 (g/cm$^3$), the water vapor barrier property decreases, or the clouding property at the time of peeling tends to be inferior, whereas if it exceeds 0.970 (g/cm$^3$), the low temperature heat sealability or clouding property tends to be impaired.

The MFR of the high-density polyethylene (c) is preferably from 1 to 15 (g/10 min), more preferably from 2 to 13 (g/10 min), and still more preferably from 3 to 12 (g/10 min). If the MFR is less than 1 (g/10 min), the low temperature heat sealability and the clouding property tend to be inferior, whereas if it exceeds 15 (g/10 min), the film readily tears in the longitudinal direction or a feathering phenomenon may occur at the time of peeling.

For laminating the layer (A) and the layer (B), a known forming method may be used. Examples thereof include an extrusion lamination method, a co-extrusion inflation method and a co-extrusion T-die casting method.

In the case of obtaining the layered film (hereinafter referred to as "layered film I") comprising at least two layers of the layer (A) and the layer (B) of the present invention by a co-extrusion method, the film is preferably formed at an extrusion temperature of 160 to 250° C. and cooled at a cooling temperature of 40 to 80° C., so that good water vapor barrier property and excellent clouding property can be obtained.

For satisfying the object of the present invention, the layered film I of the present invention has a thickness of 20 to 70 µm, preferably from 20 to 60 µm, and more preferably from 25 to 50 µm.

Examples of the layer structure include (A)/(B), (A)/(B)/(A) and (A)/(B)/other layer.

The thickness of the layer (A) is suitably from 3 to 15 µm by taking account of the invasion of water vapor from the end surface of the packaging product produced.

The thickness ratio between the layer (A) and the layer (B) is suitably layer (A):layer (B)=0.05 to 0.3:0.95 to 0.7. The thickness ratio is preferably layer (A):layer (B)=0.07 to 0.25:0.93 to 0.75, and more preferably 0.1 to 0.2:0.9 to 0.8.

If the thickness ratio of the layer (A) is less than 0.05, a location is generated where both of the layers (B) are partially heat-sealed when heat-sealing is applied and this may cause problems such that the heat seal strength elevates or on opening, the layered film is cut at the heat seal end part, and as a result, the contents cannot be easily taken out. On the other hand, if the thickness ratio of the layer (A) exceeds 0.3, feathering takes place or the water vapor barrier property of the packaging product may decrease.

In the packaging product of the present invention, a layered film comprising at least 2 layers of layer (A) and layer (B) is used, with layer (A) as the sealant layer.

In peeling the packaging product comprising the above-described layer (A) (resin composition layer) as a sealant layer, cohesive peeling due to cohesive failure is generated inside the resin composition layer comprising SLLD and PB each in specific amount, whereby excellent openability and high clouding property are revealed.

Although the reason is not clearly known, excellent clouding property as one object of the packaging product of the present invention is presumed attributable to the fact that the PB constituting the resin composition layer has a higher molecular weight and a higher cohesive energy than SLLD and therefore, when the packaging product is peeled, fine voids are generated on the interface between PB and SLLD.

In the packaging product of the present invention, a layer comprising HDPE must be stacked on the above-described sealant layer (a resin composition layer comprising SLLD and PB each in a specific amount).

This is because unless a layer comprising HDPE is stacked on the sealant layer, reduction in the water vapor barrier property or poor seal strength stability may result and in an extreme case, the periphery of the heat seal portion melts to cause bonding and the contents of the packaging product cannot be easily taken out.

Accordingly, the packaging product having excellent openability, good clouding property, high water vapor barrier property and superior seal strength stability, which is the object of the present invention, can be first obtained by using a layered film where the layer comprising HDPE is stacked on the sealant layer (a resin composition layer comprising SLLD and PB each in a specific amount).

In the packaging product of the present invention, it is also possible that one sealant layer is a resin composition layer comprising SLLD and PB each in a specific amount and another sealant layer is a layer comprising SLLD.

A suitable example of the layered film having such a layer comprising SLLD is a layered film (hereinafter referred to as "layered film II") comprising at least two layers of a linear low-density polyethylene layer [layer (C)] comprising (d) a linear low-density polyethylene, which is produced using a single site catalyst, having a density of 0.890 to 0.925 (g/cm$^3$) and an MFR of 2 to 10 (g/10 min), and a high-density polyethylene layer [layer (D)] comprising a high-density polyethylene having a density of 0.950 to 0.970 (g/cm$^3$), where the layer (C) of the layered film II is the sealant layer.

The linear low-density polyethylene (d) and the high-density polyethylene (e) used in the layered film II may be the same as those used in the layer (A) and the layer (B) of the layered film I, respectively.

For laminating the layer (C) and the layer (D), a known forming method may be used. Examples thereof include an extrusion, lamination method, a co-extrusion inflation method and a co-extrusion T-die casting method.

In the case of obtaining the layered film II of the present invention by a co-extrusion method, the film is preferably formed at an extrusion temperature of 160 to 250° C. and cooled at a cooling temperature of 50 to 80° C., so that good water vapor barrier property and excellent clouding property can be obtained.

For satisfying the object of the present invention, the layered film II comprising the layer (C) and the layer (D) of the present invention has a thickness of 20 to 70 μm, preferably from 20 to 60 μm, more preferably from 25 to 50 μm.

Examples of the layer structure include (C)/(D), (C)/(D)/(C) and (C)/(D)/other layer.

The thickness of the layer (C) is suitably from 3 to 15 μm by taking account of the invasion of water vapor from the end surface of the packaging product produced.

The thickness ratio between the layer (C) and the layer (D) is suitably layer (C):layer (D)=0.05 to 0.3:0.95 to 0.7. The thickness ratio is preferably layer (C):layer (D)=0.07 to 0.25:0.93 to 0.75, and more preferably 0.1 to 0.2:0.9 to 0.8.

If the thickness ratio of the layer (C) is less than 0.05, a location is generated where both the layers (D) are partially heat-sealed when heat-sealing is applied and this may cause problems such that the heat seal strength elevates or on opening, the layered film is cut at the heat seal end part, and as a result, the contents cannot be easily taken out.

On the other hand, if the thickness ratio of the layer (C) exceeds 0.3, feathering takes place or the water vapor barrier property of the packaging product may decrease.

As described above, in the packaging product of the present invention, it may also be possible that one sealant layer is a resin composition layer, which is stacked on the HDPE, comprising SLLD and PB each in a specific amount and another sealant layer is a layer comprising SLLD.

More specifically, the packaging product of the present invention may have a construction such that one sealant layer is the layer (A) of the layered film I and another sealant layer is the layer (C) of the layered film II.

In other words, the object of the present invention can be attained as long as at least one sealant layer of the packaging product of the present invention is the layer (A) comprising SLLD and PB of the layered film I. The other sealant layer is preferably the SLLD but may not contain PB.

The constituent materials in each layer constituting the present invention may be blended with an appropriate amount of other additives commonly used for the thermoplastic resin (for example, antioxidant, weatherability stabilizer, antistatic agent, lubricant, blocking inhibitor, antifogging agent, dye, pigment, oil, wax, filler) or other thermoplastic resins within the range of not impairing the object of the present invention.

Examples of the additives include an antioxidant such as 2,5-di-tert-butylhydroquinone, 2,6-di-tert-butyl-p-cresol, 4,4'-thiobis(6-tert-butylphenol), 2,2-methylene-bis(4-methyl-6-tert-butylphenol), octadecyl-3-(3',5'-di-tert-butyl-1'-hydroxyphenyl)propionate and 4,4'-thiobis(6-butylphenol), an ultraviolet absorbent such as ethyl-2-cyano-3,3-diphenylacrylate, 2-(2'-hydroxy-5-methylphenyl)-benzotriazole and 2-hydroxy-4-octoxybenzophenone, a plasticizer such as dimethyl phthalate, diethyl phthalate, wax, liquid paraffin and phosphoric acid ester, an antistatic agent such as pentaerythritol monostearate, sorbitan monopalmitate, sulfated oleic acid, polyethylene oxide and carbon wax, a lubricant such as ethylenebisstearamide and butyl stearate, a coloring agent such as carbon black, phthalocyanine, quinacridone, indoline, azo-type pigment, titanium oxide and red iron oxide, a filler such as glass fiber, asbestos, mica, wollastonite, calcium silicate, aluminum silicate and calcium carbonate, and an antiblocking agent such as silica type antiblocking agent, silicone type antiblocking agent, zeolite type antiblocking agent, talc, and polymethylmethacrylate (PMMA) particles. Many other polymer compounds may also be blended to the extent of not inhibiting the operational effect of the present invention.

The method for blending the resin composition of the present invention is not particularly limited and a known method may be used. For example, a method of mixing respective components by a mixer such as mixing roll, Banbury mixer, Henschel mixer, tumbler or ribbon blender and then pelletizing the mixture using an extruder, or a method of directly dry-blending and forming the components may be used.

Other polyolefin-base resin layers may also be further laminated within the range of not impairing the object of the present invention.

The layered film of the present invention can be made into a formed article by a known extrusion laminating method using a forming machine. Also, by using a known dry-lamination machine, other materials may be laminated before use, to provide a gas barrier layer of aluminum foil, metallized film, silicon oxide-deposited film, vinylidene chloride resin or ethylene-vinyl acetate copolymer saponified product, a polyester resin layer, a polyamide resin layer or a polycarbonate resin layer.

EXAMPLES

The present invention is described in greater detail below by referring to the Examples. However, the present invention is not limited to these Examples.

[Resins Used in Layers (A) to (D)]

PE 1:

"HARMOREX LL NH935C (trade name)" produced by Japan Polyolefins Co., Ltd., which is a single site-type catalyst linear low-density polyethylene having an MFR of 15 (g/10 min) and a density of 0.912 (g/cm$^3$).

PE 2:

"HARMOREX LL NH725A (trade name)" produced by Japan Polyolefins Co., Ltd., which is a single site-type catalyst linear low-density polyethylene having an MFR of 8 (g/10 min) and a density of 0.907 (g/cm$^3$).

PE 3:

"J-REX LD JH606N (trade name)" produced by Japan Polyolefins Co., Ltd., which is a high pressure process low-density polyethylene produced using a peroxide, having an MFR of 7.0 (g/10 min) and a density of 0.918 (g/cm$^3$).

PE 4:

A Ziegler-Natta catalyst linear low-density polyethylene having an MFR of 2 (g/10 min) and a density of 0.929 (g/cm$^3$).

PE 5:

A high pressure process low-density polyethylene produced using a peroxide, having an MFR of 3.5 (g/10 min) and a density of 0.924 (g/cm$^3$).

PE 6:

"HARMOREX LL NC574R (trade name)" produced by Japan Polyolefins Co., Ltd., which is a single site-type catalyst linear low-density polyethylene having an MFR of 3.5 (g/10 min) and a density of 0.921 (g/cm$^3$).

PE 7:

"HARMOREX LL NC554R (trade name)" produced by Japan Polyolefins Co., Ltd., which is a single site-type catalyst linear low-density polyethylene having an MFR of 3.5 (g/10 min) and a density of 0.915 (g/cm$^3$).

PE 8:

"J-REX AC464A (trade name)" produced by Japan Polyolefins Co., Ltd., which is a Ziegler-Natta catalyst linear low-density polyethylene having an MFR of 2.8 (g/10 min) and a density of 0.932 (g/cm$^3$).

HDPE 1:

A high-density polyethylene having an MFR of 7.6 (g/10 min) and a density of 0.958 (g/cm$^3$).

HDPE 2:

A high-density polyethylene having an MFR of 10.8 (g/10 min) and a density of 0.962 (g/cm$^3$).

HDPE 3:

A high-density polyethylene having an MFR of 3.6 (g/10 min) and a density of 0.964 (g/cm$^3$).

HDPE 4:

A high-density polyethylene having an MFR of 8.6 (g/10 min) and a density of 0.945 (g/cm$^3$).

HDPE 5:

A high-density polyethylene having an MFR of 8.5 (g/10 min) and a density of 0.960 (g/cm$^3$).

PB 1:

"BEAULON BL4000 (trade name)" produced by Mitsui Chemicals Inc., which is a polybutene-1 having an MFR of 1.8 (g/10 min), a density of 0.915 (g/cm$^3$) and a melting point of 125° C.

PB 2:

"BEAULON BL7000 (trade name)" produced by Mitsui Chemicals Inc., which is a polybutene-1 having an MFR of 20 (g/10 min), a density of 0.917 (g/cm$^3$) and a melting point of 123° C.

PB 3:

"BEAULON M2181 (trade name)" produced by Mitsui Chemicals Inc., which is a polybutene-1 having an MFR of 1.0 (g/10 min), a density of 0.900 (g/cm$^3$) and a melting point of 75° C.

PP 1:

A propylene-ethylene random copolymer having an ethylene content of 6.5 wt % and an MFR at a temperature of 230° C. under a load of 2.16 kg, of 20 (g/10 min).

PP 2:

A homopolypropylene having an MFR of 8.5 (g/10 min).

[Preparation of Specimen]

[Kneading Treatment]

The component (a) and the component (b) as constituent materials of the layer (A) were mixed in a tumbler and then the mixture was pelletized at a temperature of 190 to 210° C. using a twin extruder (Model KTX37, manufactured by Kobe Steel, Ltd.). At this time, 4,000 ppm of PMMA particles were added as a blocking inhibitor.

[T-Die Casting]

Using each kneaded pellet material, a film was prepared at a die temperature of 210° C. using a T-die film casting machine having an aperture of 65-mmφ and a die width of 1,300 mm manufactured by Toshiba Machine Co., Ltd. by appropriately varying the total thickness. The layer structure of the layered film I comprising the layer (A) and the layer (B) was a two-kind three-layer structure of layer (A)/layer (B)/layer (A). The layer structure of the layered film II comprising layer (C) and layer (D) was also a two-kind three-layer structure. Respective layers of the layered film I had a thickness of layer (A)/layer (B)/layer (A)=6 μm/28 μm/6 μl and respective layers of the layered film II also had a thickness of layer (C)/layer (D)/layer (C)=6 μm/28 μm/6 μm. In the T-die casting, the cooling temperature was 70° C.

On each film, a polyester film having a thickness of 12 μm and an aluminum foil having a thickness of 15 m were laminated by a dry-lamination method. The layer (A) of the thus-obtained layered film I and the layer (C) of the layered film II were heat-sealed to produce a packaging product and the obtained packaging product was evaluated as follows. The evaluation of the water vapor permeation amount was performed for the layered film I.

[Heat Seal]

Using a heat sealer manufactured by Tester Sangyo Co., Ltd., a heat-seal treatment was performed by a double cut heat-seal bar having an asperity inclination angle of 55° under a pressure of 2 kg/cm$^2$ for 1 second.

[Measurement of Properties]

[Seal Strength]

A film after heat-sealing was cut into a width of 15 mm and determined on the 1800 peel strength at a pulling rate of 300 mm/min using a tension tester (Model RTA-100, manufactured by Olientech). In the test, an average of 10 specimens was determined. The sealing temperature was appropriately varied.

[Clouding Property]

After the determination of the seal strength, the clouding property of the peeled heat-seal portion for the specimen was observed with an eye. Evaluation was performed according to the following criteria.

○: The peeled heat-seal portion was thoroughly clouded and the clouding was easily confirmed.

Δ: The peeled heat-seal portion was slightly clouded and the clouding was not easily confirmed.

×: The peeled heat-seal portion was not clouded at all.

[Appearance]

After the determination of the seal strength, the peeled portion was judged by eye whether or not feathering occurred according to the following criteria.

○: Feathering was not observed at all.

Δ: Feathering was partially observed.

×: A conspicuous feathering was observed and the appearance was bad.

[Water Vapor Transmission Rate]

In accordance with ASTM E96, the water vapor transmission rate at a temperature of 37.8° C. and a relative humidity of 90% was measured using a water vapor permeation tester PERMATRAN-W manufactured by Modern Control Ltd.

Examples 1 to 9 and Comparative Examples 1 to 4

The heat sealability and water vapor transmission rate were measured using the layered film I and layered film II shown in Table 1. The results are shown in Table 1.

Examples 10 to 13 and Comparative Example 5

In casting of the layered film I and the layered film II of Examples 1 and 2 and Comparative Example 4, the cooling temperature was changed to 30° C., 40° C. or 60° C. Subsequently, the same procedure as in Example 1 was performed and then each specimen was subjected to the above-described evaluation. The water vapor transmission rate of the layered film II was evaluated. The results obtained are shown in Table 2.

Examples 14 to 17 and Comparative Examples 6 to 7

In each of the layered film I of Example 1, Comparative Example 2 and Comparative Example 4, the total thickness and the thickness structure of respective layers were changed. Thereafter, the layer (A) and the layer (A) of each layered film I were heat-sealed. Subsequently, the same procedure as in Example 1 was performed.

The results obtained are shown in Table 3.

INDUSTRIAL APPLICABILITY

The layered film of the present invention exhibits, when used as a sealant film, excellent openability, good clouding property, high water vapor barrier property and superior seal

TABLE 1

| | Layered Film I | | | | Layered Film II | | | | | | | |
|---|---|---|---|---|---|---|---|---|---|---|---|---|
| | Constituent Material of Layer (A) | | | | | | | | | | | |
| Examples | Component (a) | | Component (b) | | Constit- | Constit- | Constit- | Heat-Seal Property | | | | Water Vapor |
| and Comparative | | Amount Blended | | Amount Blended | uent Material | uent Material | uent Material | Seal Strength (N/15 mm-width) | | | Clouding | Transmission Rate |
| Examples | Kind | (wt %) | Kind | (wt %) | of (B) | of (C) | of (D) | 120° C. | 140° C. | 160° C. | Property | Appearance | (g/m² · day) |
| Example 1 | PE 1 | 65 | PB 1 | 35 | HDPE 1 | PE 6 | HDPE 5 | 4.02 | 5.49 | 8.13 | ○ | ○ | 5.2 |
| Example 2 | PE 1 | 75 | PB 1 | 25 | HDPE 1 | PE 6 | HDPE 5 | 5.10 | 7.64 | 9.31 | ○ | ○ | 4.9 |
| Example 3 | PE 1 | 85 | PB 1 | 15 | HDPE 1 | PE 6 | HDPE 5 | 5.68 | 8.13 | 9.60 | ○ | ○ | 4.8 |
| Example 4 | PE 2 | 70 | PB 1 | 30 | HDPE 1 | PE 6 | HDPE 5 | 4.21 | 5.68 | 8.23 | ○ | ○ | 5.4 |
| Example 5 | PE 1 | 70 | PB 1 | 30 | HDPE 2 | PE 6 | HDPE 5 | 4.41 | 6.27 | 8.62 | ○ | ○ | 5.2 |
| Example 6 | PE 1 | 80 | PB 1 | 20 | HDPE 3 | PE 6 | HDPE 5 | 6.08 | 8.13 | 9.51 | ○ | ○ | 5.4 |
| Example 7 | PE 2 | 80 | PB 1 | 20 | HDPE 1 | PE 7 | HDPE 5 | 6.66 | 8.33 | 9.70 | ○ | ○ | 4.9 |
| Example 8 | PE 1 | 70 | PB 2 | 30 | HDPE 1 | PE 6 | HDPE 5 | 8.72 | 14.2 | 22.1 | Δ | X | 11.3 |
| Example 9 | PE 1 | 80 | PB 3 | 20 | HDPE 1 | PE 6 | HDPE 5 | 13.2 | 21.2 | 28.0 | Δ | X | 11.1 |
| Comparative Example 1 | PE 3 | 80 | PB 1 | 20 | HDPE 1 | PE 6 | HDPE 5 | 1.08 | 15.0 | 22.6 | X | X | 9.1 |
| Comparative Example 2 | PP 1 | 80 | PE 4 | 20 | PP2 | PP 2 | PP 2 | 0.49 | 2.74 | 10.8 | Δ | Δ | 8.8 |
| Comparative Example 3 | PE 1 | 70 | PB 2 | 30 | HDPE 4 | PE 6 | HDPE 4 | 2.06 | 15.9 | 23.8 | X | Δ | 11.5 |
| Comparative Example 4 | PE 3 | 70 | PB 3 | 30 | HDPE 4 | PE 5 | HDPE 4 | 3.82 | 16.2 | 17.8 | X | X | 12.8 |

TABLE 2

| | | | Heat-Seal Property | | | | | Water Vapor Transmission Rate (g/m² · day) | |
|---|---|---|---|---|---|---|---|---|---|
| Examples and Comparative Examples | Kind of Film | Cooling Temperature (° C.) | Heat Seal Strength (N/15 mm-width) | | | Clouding Property | Appearance | Layered Film I | Layered Film II |
| | | | 120° C. | 140° C. | 160° C. | | | | |
| Example 10 | Example 1 | 45 | 5.00 | 6.27 | 8.92 | ○ | ○ | 5.8 | 5.3 |
| Example 11 | Example 1 | 60 | 4.31 | 5.78 | 8.62 | ○ | ○ | 5.4 | 4.9 |
| Example 12 | Example 2 | 55 | 5.59 | 8.43 | 9.60 | ○ | ○ | 5.6 | 5.1 |
| Example 13 | Example 1 | 30 | 8.33 | 11.5 | 13.5 | Δ | Δ | 8.1 | 7.5 |
| Comparative Example 5 | Comparative Example 4 | 60 | 1.18 | 2.45 | 14.8 | X | X | 8.6 | 8.3 |

TABLE 3

| | | | Layer Thickness Structure (μm) | | | Heat-Seal Property | | | | | Water Vapor Transmission Rate (g/m² · day) |
|---|---|---|---|---|---|---|---|---|---|---|---|
| Examples and Comparative Examples | Kind of Film | Total Thickness (μm) | Layer (A) | Layer (B) | Layer (C) | Seal Strength (N/15 mm-width) | | | Clouding Property | Appearance | |
| | | | | | | 120° C. | 140° C. | 160° C. | | | |
| Example 14 | Example 1 | 30 | 4 | 22 | 4 | 5.68 | 7.74 | 11.0 | ○ | ○ | 6.6 |
| Example 15 | Example 1 | 40 | 10 | 20 | 10 | 4.80 | 6.66 | 9.31 | ○ | ○ | 5.8 |
| Example 16 | Example 1 | 50 | 15 | 20 | 15 | 4.31 | 5.98 | 8.53 | ○ | ○ | 5.9 |
| Example 17 | Example 1 | 40 | 18 | 4 | 18 | 8.72 | 11.9 | 17.7 | Δ | Δ | 17.1 |
| Comparative Example 6 | Comparative Example 2 | 30 | 4 | 22 | 4 | 2.06 | 3.82 | 15.5 | X | X | 7.9 |
| Comparative Example 7 | Comparative Example 4 | 40 | 10 | 20 | 10 | 5.00 | 17.8 | 21.1 | X | X | 12.1 | strength stability as compared with conventional films, and is suitable as a food or medical packaging material.

In particular, the layered film of the present invention is suitable as a sealant film of a packaging product which is produced through knurl-sealing, such as a packaging product for sugar blood measuring electrode.

What is claimed is:

1. A layered film comprising at least a resin composition layer (A) comprising (a) from 60 to 90% by weight of a linear low-density polyethylene produced using a single site catalyst and (b) from 40 to 10% by weight of a polybutene-1, and a high-density polyethylene layer (B) comprising (c) a high-density polyethylene having a density of 0.95 to 0.970 g/cm$^3$, wherein the resin composition layer (A) is layered on the high-density polyethylene layer (B).

2. The layered film as claimed in claim 1, wherein said linear low-density polyethylene (a) of the layer (A) has a density of 0.890 to 0.935 g/cm$^3$ and a melt flow rate of 2 to 20 g/10 min.

3. The layered film as claimed in claim 1, wherein said high-density polyethylene (c) of the layer (B) has a melt flow rate of 1 to 15 g/10 min.

4. The layered film as claimed in any one of claims 1 to 3, which is produced by forming a film at an extrusion temperature of 160 to 250° C. and cooling the film at a cooling temperature of 40 to 80° C.

5. A packaging product comprising a sealant layers, wherein the sealant layer is a layer (A) of a layered film comprising at least a resin composition layer (A) comprising (a) from 60 to 90% by weight of a linear low-density polyethylene produced using a single active site catalyst and (b) from 40 to 10% by weight of a polybutene-1, and a high-density polyethylene layer (B) comprising (c) a high-density polyethylene having a density of 0.950 to 0.970 g/cm$^3$, wherein the resin composition layer (A) is layered on the high-density polyethylene layer (B).

6. A packaging product comprising a sealant layers as claimed in claim 5, further comprising a sealant layer of a linear low-density polyethylene layer (C) comprising (d) a linear low-density polyethylene, which is produced using a single active site catalyst having a density of 0.890 to 0.925 g/cm$^3$ and a melt flow rate of 2 to 10 g/10 min, wherein the layer (A) and layer (C) are heat-sealed.

7. The packaging product comprising a sealant layer as claimed in claim 5, further comprising a sealant layer which is a layer (C) of a layered film comprising at least a linear low-density polyethylene layer (C) comprising (d) a linear low-density polyethylene, which is produced using a single site catalyst, having a density of 0.890 to 0.925 g/m$^3$ and a melt flow rate of 2 to 10 g/10 min, and a high-density polyethylene layer (D) comprising (e) a high-density polyethylene having a density of 0.950 to 0.970 g/cm$^3$, wherein the layer (A) and layer (C) are heat-sealed.

8. The packaging product as claimed in claim 5, wherein the layer (A) has a thickness of 3 to 15 µm.

9. The packaging product as claimed in any one of claims 5 to 8, wherein the layered film comprising at least two layers of the layer (A) and the layer (B) is produced by forming a film at an extrusion temperature of 160 to 250° C. and cooling the film at a cooling temperature of 40 to 80° C.

10. A layered film comprising at least a linear low-density polyethylene layer (C) consisting of (d) a linear low-density polyethylene, which is produced using a single site catalyst, having a density of 0.890 to 0.925 g/cm$^3$ and a melt flow rate of 2 to 10 g/10 min, and a high-density polyethylene layer (D) consisting of (e) a high-density polyethylene having a density of 0.950 to 0.970 g/cm$^3$, wherein the linear low-density polyethylene layer (C) is layered on the high-density polyethylene layer (D).

11. The layered film as claimed in claim 10, which is produced by forming a film at an extrusion temperature of 160 to 250° C. and cooling the film at a cooling temperature of 40 to 80° C.

* * * * *